Aug. 11, 1970     A. SIMON     3,523,727
MEANS FOR PRODUCING FOG FILMS
Filed Aug. 22, 1968
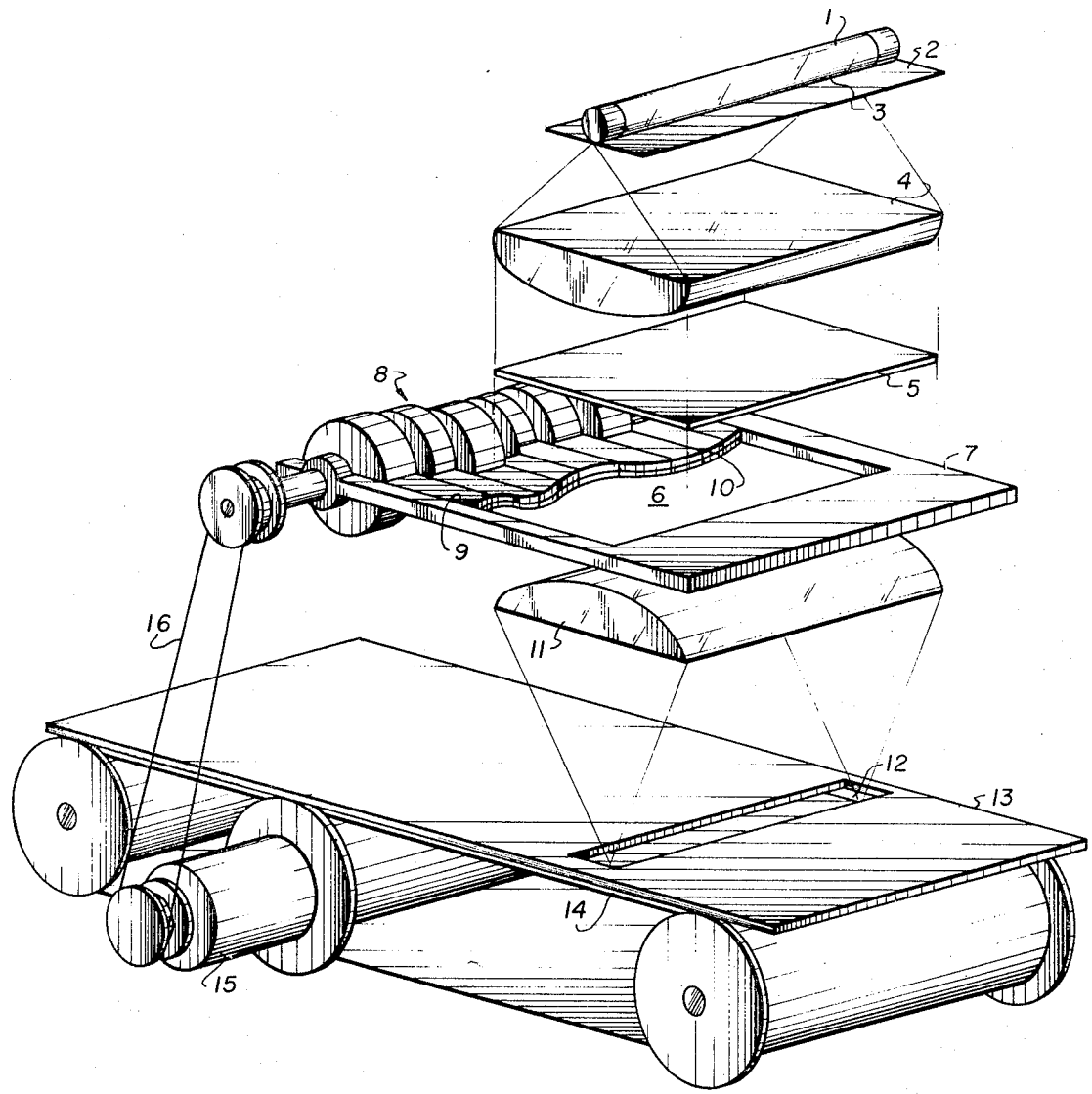
INVENTOR.
ARTHUR SIMON
BY *James M. Nickels*
ATTORNEY United States Patent Office 3,523,727
Patented Aug. 11, 1970

3,523,727
MEANS FOR PRODUCING FOG FILMS
Arthur Simon, Fair Lawn, N.J., assignor to The Bendix Corporation, a corporation of Delaware
Filed Aug. 22, 1968, Ser. No. 754,635
Int. Cl. G03b 27/50
U.S. Cl. 355—18         7 Claims

ABSTRACT OF THE DISCLOSURE

The device produces films simulating fog with an apparatus having a light source and a pair of plano-cylindrical lenses located adjacent to a variable-opening aperture. The planar side of one of the lenses lies in juxtaposition to the light source, while the cylindrical sides of both lenses lie in juxtaposition to opposite sides of the variable-opening aperture, and the planar side of the other lens lies in juxtaposition to the elongated opening in a mask. Motor-driven cam followers vary the aperture opening irregularly to produce variations in the light intensity. After passing through the variable-opening aperture and plano-cylindrical lenses the light rays from the source are focused through the elongated opening in the mask onto a film, which is adjustably positioned adjacent the mask so as to form an exposure line image on the film. A motor in synchronism with the variations in the aperture adjustably positions the film so as to effect an accurate transformation of the cam follower positions into intensity of exposure along the exposure line image.

CROSS REFERENCES TO RELATED APPLICATIONS

The present invention may be utilized in fog simulators as disclosed and claimed in co-pending U.S. application Ser. No. 576,298 filed Aug. 31, 1966, by Paul A. Noxon, now U.S. Pat. No. 3,436,840, granted Apr. 8, 1969; copending U.S. application Ser. No. 604,476 filed Dec. 23, 1966, by Paul A. Noxon, now U.S. Pat. No. 3,427,730, granted Feb. 18, 1969; copending U.S. application Ser. No. 738,641 filed June 20, 1968, by Arthur Simon et al. and copending U.S. application Ser. No. 745,764 filed July 18, 1968 by Arthur Simon et al. All of the aforenoted applications and patents are assigned to The Bendix Corporation.

BACKGROUND OF THE INVENTION

Field of the invention

The present invention relates to fog simulators and, more particularly, to means for producing fog films for use in said fog simulator.

Description of the prior art

In the past, in order to produce film of this general type, it was necessary to produce several short films and then combine them with a splice. This presented problems of alignment which required precision apparatus to come up with an acceptable film. The present invention provides means and methods for producing such a film directly.

SUMMARY OF THE INVENTION

Means for producing a fog pattern on a film in which light is passed through an aperture variable in a predetermined manner and re-imaged through a lens into a line for exposing a film through a line mask.

BRIEF DESCRIPTION OF THE DRAWING

The single figure of the drawing is a perspective schematic view illustrating the principal components of a system embodying the invention.

DESCRIPTION OF THE PREFERRED EMBODIMENT

In the drawing, a linear light source 1, which may be a fluorescent lamp, has a mask 2 which has a linear opening 3 in register with the light source 1. Light rays from the source 1 pass through the opening 3 in the mask 2 and through a planocylindrical collimator lens 4 having a planar side in juxtaposition to the light source and a cylindrical side in juxtaposition to a diffuser 5 to provide uniform illumination over a variable opening aperture 6 in a frame 7.

Attached to the frame 7 is a three-dimensional cam assembly 8. The cam assembly 8 engages a pluarality of spring loaded cam followers 9 which are operative in register with the aperture 6 to vary the opening of the aperture 6. An interpolating band 10 of a suitable flexible material is secured to the cam followers 9 to smooth the transition from each follower to the adjacent one. The light rays passing through the aperture 6 are re-imaged by another plano-cylindrical lens 11 having a cylindrical side in juxtaposition to the variable opening aperture 6 so that the light rays may be focused through an elongated opening 12 in a mask 13 onto a film 14 by a planar side of the lens 11 so as to form a line image on said film 14. The film 14 is moved at a constant speed by synchronous motor 15. The motor 15 also drives the cam assembly 8 through gears or a no-slip belt 16 to vary the opening of the aperture 6. After being exposed, the film 14 is developed in a conventional manner. It is understood that the system would be enclosed in a suitable housing.

The lens 11 serves to transform the light rays passing through the variable opening aperture 6 which may be quite large, for example X inches into tenths of an inch along one axis, so as to form an exposure line image on the film 14. This permits an accurate transformation of follower position (cam profile) into intensity of exposure of the light rays on the film 14 along the exposure line image. The synchronous motor 15 assures constant cam and film speed.

Although only one embodiment of the invention has been illustrated and described, various changes in the form and relative arrangement of the parts which will now appear to those skilled in the art, may be made without departing from the scope of the invention.

What is claimed is:

1. Apparatus for producing fog films comprising a source of light rays, a frame having a variable opening aperture therein, a pair of plano-cylindrical lenses in alignment with said aperture, a mask having an elongated opening therein, said opening being in alignment with said lenses, one of said plano-cylindrical lenses having a planar side in juxtaposition to said source of light rays and a cylindrical side in juxtaposition to one side of said frame, a film movable with respect to said opening in the mask at an opposite side of the mask from said lenses and in register with said elongated opening, another of said plano-cylindrical lenses having a cylindrical side in juxtaposition to an opposite side of said frame, and said other of said lenses having a planar side so arranged that light rays from said source in passing through said lenses may be focused onto the film to form a line image thereon, and means for simultaneously varying the opening of said aperture in the frame and moving said film over said opening in the mask.

2. The combination as set forth in claim 1 in which the means for simultaneously varying said aperture and moving said film is a synchronous motor.

3. The combination as set forth in claim 1 in which said other plano-cylindrical lens re-images light rays passing through said variable opening aperture into said line image.

4. Apparatus for producing fog films comprising a light source, a frame having a variable opening aperture therein, means to vary the opening of said aperture, a mask having an elongated opening therein, first and second lens means in alignment with the elongated opening in the mask and in alignment with said variable opening aperture, said first lens means being positioned between said light source and the variable opening aperture in the frame to provide uniform illumination over the variable opening aperture, said second lens means being positioned between said variable opening aperture in the frame and the elongated opening in the mask, a film movably positioned with respect to said opening in the mask at an opposite side of the mask from said second lens means and in register with said elongated opening, the second lens means to focus light rays passing through the variable opening aperture in the frame through the elongated opening in the mask onto the film to form an exposure line image on the film which varies with intensity of the light rays passing through the variable opening aperture, and means for simultaneously operating the means to vary the opening of said aperture with the movement of said film over said opening in the mask.

5. The combination as set forth in claim 4 in which a cam follower assembly varies the opening of said aperture.

6. The combination as set forth in claim 5 in which said cam follower assembly includes a plurality of cams and a plurality of spring loaded followers.

7. The combination as set forth in claim 6 and including an interpolating band secured to said followers to smooth the transition from each follower to the adjacent follower.

References Cited

UNITED STATES PATENTS

| | | | |
|---|---|---|---|
| 1,925,355 | 9/1933 | Whitson | 355—83 |
| 2,976,362 | 3/1961 | Stamps | 355—18 X |
| 3,103,849 | 9/1963 | Wise | 346—107 X |

NORTON ANSHER, Primary Examiner

K. C. HUTCHISON, Assistant Examiner

U.S. Cl. X.R.

346—107